United States Patent
Kudo et al.

(10) Patent No.: US 11,830,714 B2
(45) Date of Patent: Nov. 28, 2023

(54) ANALYSIS METHOD AND NON-TRANSITORY COMPUTER READABLE MEDIUM

(71) Applicant: SHIMADZU CORPORATION, Kyoto (JP)

(72) Inventors: Yukihiko Kudo, Kyoto (JP); Shinji Sugimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/294,888

(22) PCT Filed: Nov. 20, 2019

(86) PCT No.: PCT/JP2019/045487
§ 371 (c)(1),
(2) Date: May 18, 2021

(87) PCT Pub. No.: WO2020/110864
PCT Pub. Date: Jun. 4, 2020

(65) Prior Publication Data
US 2022/0013344 A1    Jan. 13, 2022

(30) Foreign Application Priority Data

Nov. 26, 2018  (JP) ................................ 2018-220328

(51) Int. Cl.
*H01J 49/00* (2006.01)
*G01N 30/72* (2006.01)
(Continued)

(52) U.S. Cl.
CPC ........ *H01J 49/0036* (2013.01); *G01N 27/623* (2021.01); *G01N 30/7206* (2013.01); *G01N 30/7233* (2013.01); *H01J 49/4215* (2013.01)

(58) Field of Classification Search
CPC .............. H01J 49/0036; H01J 49/4215; G01N 30/7206; G01N 30/7233; G01N 30/72; G01N 30/8665; G01N 27/62
(Continued)

(56) References Cited

U.S. PATENT DOCUMENTS

2010/0120161 A1   5/2010  Iida
2010/0272610 A1   10/2010 Iida
(Continued)

FOREIGN PATENT DOCUMENTS

CN     105051529 A    11/2015
JP     04-190158 A    7/1992
(Continued)

OTHER PUBLICATIONS

Written Opinion of the International Searching Authority for PCT/JP2019/045487 dated Feb. 18, 2020 (PCT/ISA/237).
(Continued)

*Primary Examiner* — Michael Maskell
(74) *Attorney, Agent, or Firm* — Sughrue Mion, PLLC

(57) ABSTRACT

An analysis method includes analyzing a reference sample that contains a predetermined amount of a predetermined component by an analysis device using a chromatograph and obtaining a reference detection value which is a detection value of the predetermined amount of the predetermined component detected by the analysis device, calculating a judgment reference value which is a criterion for judging whether a concentration of a detection subject component in a measurement subject sample is equal to or larger than a reference concentration or equal to or smaller than the reference concentration based on the reference detection value, and analyzing the measurement subject sample by the analysis device and judging that the detection subject component has been detected in a case where a detection value
(Continued)

exceeding the judgment reference value is detected in a peak detection time zone corresponding to the detection subject component.

13 Claims, 4 Drawing Sheets

(51) Int. Cl.
*G01N 27/623* (2021.01)
*H01J 49/42* (2006.01)

(58) Field of Classification Search
USPC .................................. 250/281, 282; 73/1.02
See application file for complete search history.

(56) References Cited

U.S. PATENT DOCUMENTS

| | | | |
|---|---|---|---|
| 2012/0103054 A1 | 5/2012 | Sugiyama | |
| 2014/0260509 A1* | 9/2014 | Pohl | G01N 30/8668 73/1.02 |
| 2019/0178857 A1* | 6/2019 | Nakashima | G01N 30/88 |
| 2019/0324373 A1 | 10/2019 | Kamimura | |

FOREIGN PATENT DOCUMENTS

| | | |
|---|---|---|
| JP | 2003-057220 A | 2/2003 |
| JP | 2008-241517 A | 10/2008 |
| JP | 2012-108118 A | 6/2012 |
| JP | 2012-163476 A | 8/2012 |
| JP | 2016-510900 A | 4/2016 |
| JP | 2018-169257 A | 11/2018 |
| JP | 2019-074391 A | 5/2019 |
| WO | 2008/133325 A1 | 11/2008 |
| WO | 2017/221344 A1 | 12/2017 |
| WO | 2018/128159 A1 | 7/2018 |
| WO | 2018/198207 A1 | 11/2018 |

OTHER PUBLICATIONS

International Search Report for PCT/JP2019/045487 dated Feb. 18, 2020 (PCT/ISA/210).
Office Action dated Nov. 24, 2021 in Japanese Application No. 2020-557597.
Office Action dated May 24, 2022 in Japanese Application No. 2020-557597.
Office Action dated Jan. 10, 2023 from the Japanese Patent Office in JP Application No. 2020-557597.
Chinese Office Action corresponding to Chinese Patent Application No. 201980077352.8, dated Jun. 25, 2023.
Decision of Refusal in the counterpart Japanese patent application (2020-557597), dated Aug. 22, 2023 and English machine translation.
Decision of Dismissal of Amendment in the counterpart Japanese patent application (2020-557597), dated Aug. 22, 2023 and English machine translation.

* cited by examiner

F I G. 4
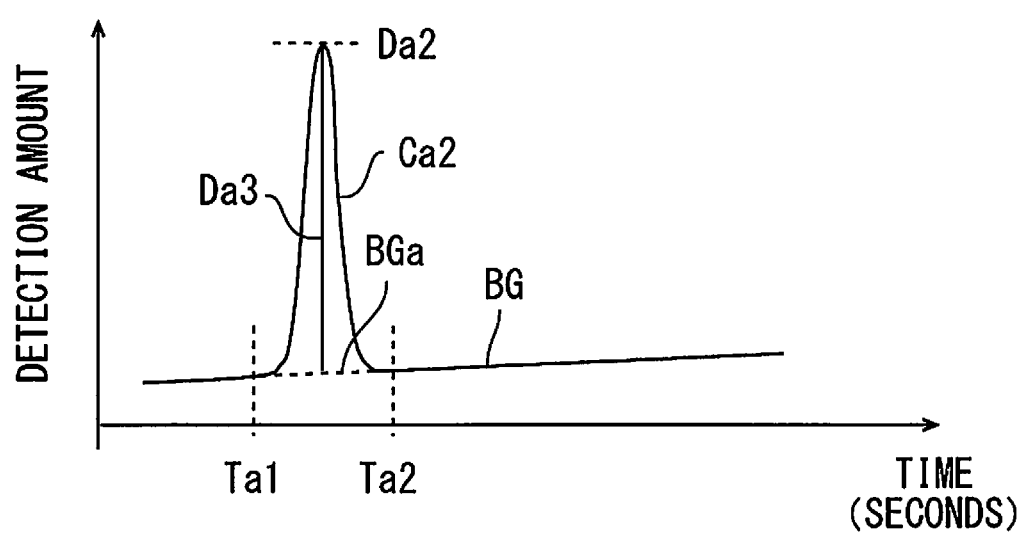

ANALYSIS METHOD AND NON-TRANSITORY COMPUTER READABLE MEDIUM

CROSS REFERENCE TO RELATED APPLICATIONS

This application is a National Stage of International Application No. PCT/JP2019/045487 filed Nov. 20, 2019, claiming priority based on Japan Patent Application No. 2018-220328 filed Nov. 26, 2018.

TECHNICAL FIELD

The present invention relates to an analysis method and a non-transitory computer readable medium storing a chromatographic control program.

BACKGROUND ART

A gas chromatograph, a liquid chromatograph and a so-called GC/MS or LC/MS analysis device which is a combination of the gas chromatograph, the liquid chromatograph and a mass spectrometer are widely used for an analysis in regard to whether an analysis sample includes a restricted substance or the like at a concentration equal to or larger than a reference concentration (see Patent Document 1).

CITATION LIST

Patent Document

[Patent Document 1] JP 2003-057220 A

SUMMARY OF INVENTION

Technical Problem

In a chromatograph, even in a case where the same amount of a detection subject component is analyzed, a measured amount of the detection subject component may change depending on a state of the chromatograph at the time of measurement (a change overtime).

Therefore, depending on a state of the chromatograph, presence of a restriction subject substance an amount of which is equal to or larger than a reference amount (reference concentration) may not be detected and missed, for example.

Further, with a conventional analysis method using a gas chromatograph, in a case where identification of a detected peak or a waveform cutting process is inappropriate, even when a detection subject component is included at a high concentration, the detection subject component cannot be judged as a detection subject component and may be missed.

Solution to Problem

An analysis method according to one aspect includes analyzing a reference sample that contains a predetermined amount of a predetermined component by an analysis device using a chromatograph and obtaining a reference detection value which is a detection value of the predetermined amount of the predetermined component detected by the analysis device, calculating a judgment reference value which is a criterion for judging whether a concentration of a detection subject component in a measurement subject sample is equal to or larger than a reference concentration or equal to or smaller than the reference concentration based on the reference detection value, and analyzing the measurement subject sample by the analysis device and judging that the detection subject component has been detected in a case where a detection value exceeding the judgment reference value is detected in a peak detection time zone corresponding to the detection subject component.

A non-transitory computer readable medium storing a program according to a second aspect for controlling an analysis device using a chromatograph causes a computer to execute the processes of analyzing a reference sample containing a predetermined amount of a predetermined component, obtaining a reference detection value which is a detection value of the predetermined amount of the predetermined component detected by the analysis device, calculating a judgment reference value which is a criterion for judging whether a detection subject component is present in a measurement subject sample at a concentration equal to or larger than a reference concentration based on the reference detection value, and analyzing the measurement subject sample by the analysis device and judging that the detection subject component has been detected in a case where a detection value exceeding the judgment reference value is detected in a peak detection time zone corresponding to the detection subject component.

Advantageous Effects of Invention

The present invention enables correction of a change of a chromatograph over time and accurate judgment about whether an amount equal to or larger than a reference amount (a reference concentration, for example) of a detection subject component is present.

BRIEF DESCRIPTION OF THE DRAWINGS

FIG. 3A is a diagram showing the overview of a result of analysis of a reference sample and a reference detection value, and each of FIGS. 3B and 3C is a diagram showing the overview of a judgment reference value and a result of analysis of a measurement subject sample.

FIG. 4 is a diagram showing a modified example of a method of determining a reference detection value.

DESCRIPTION OF EMBODIMENTS

First Embodiment of Analysis Method

Figure 1:
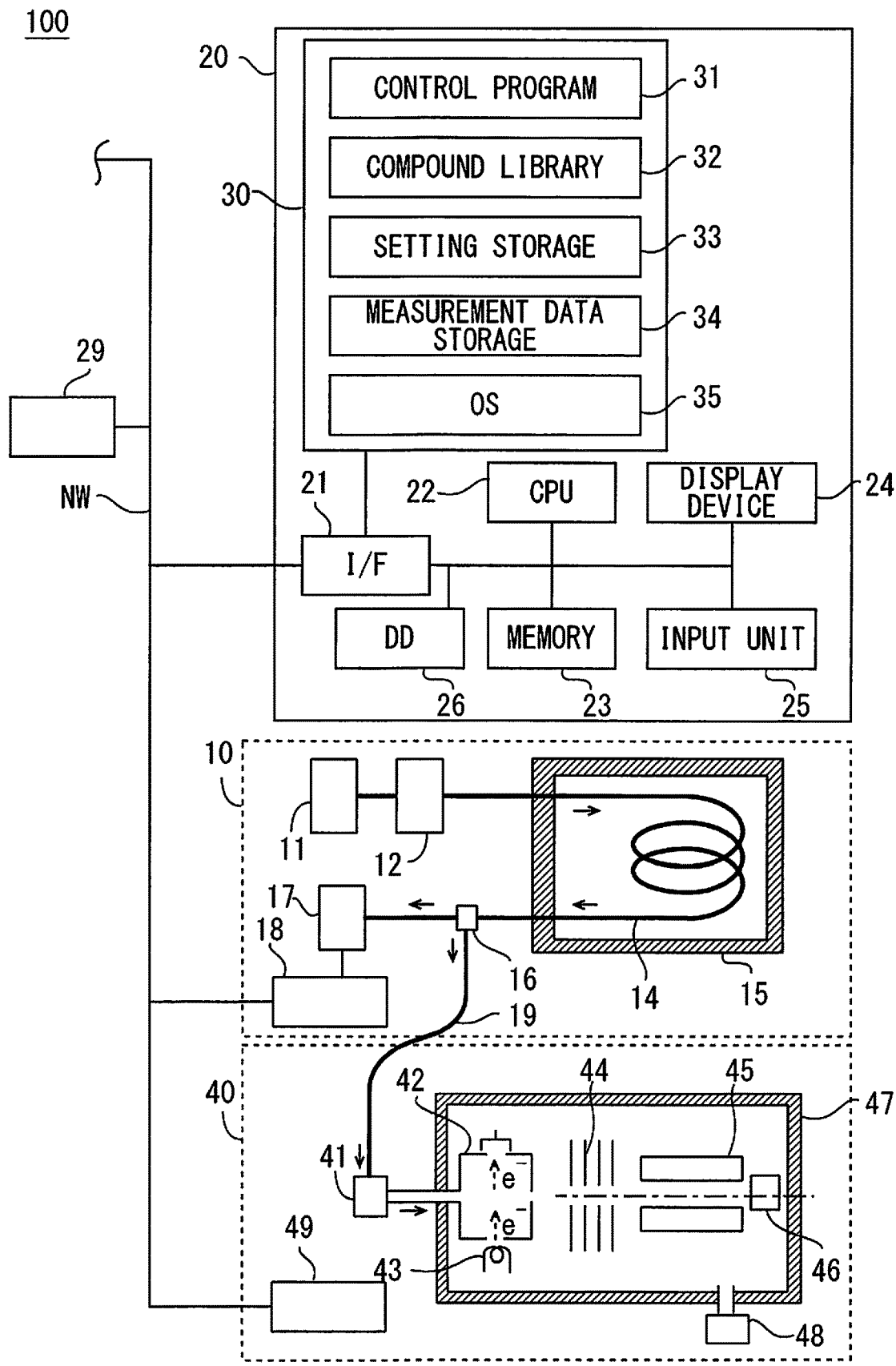
FIG. 1 is a diagram showing one example of an analysis device for performing an analysis using an analysis method of one embodiment.

FIG. 1 is a diagram showing one example of an analysis device 100 for performing an analysis using an analysis method of a first embodiment. The analysis device 100 includes a chromatograph 10, a mass spectrometer 40 and a controller 20 that controls the chromatograph 10 and the mass spectrometer 40.

The chromatograph 10 is a gas chromatograph as one example and includes a separation column 14, a column oven 15 that encloses the column 14, a sample injector 11 and a sample vaporization chamber 12 that are provided at the inlet of the column 14. Further, the chromatograph 10 includes a branch valve 16 provided at the outlet of the column 14, a detector 17 such as an FID detector and a GC controller 18 that controls the branch valve 16 and the detector 17.

The mass spectrometer 40 is a quadrupole mass spectrometer as one example, and includes a quadrupole mass filter 45 that separates ions in accordance with an m/z, and an ion detector 46. The mass spectrometer 40 further includes a sample introducer 41 that receives supply of a sample gas through a conveyance pipe 19 from the branch valve 16, an ionizer 42, an ion optical system 44 and an MS controller 49 that controls the sample introducer 41, the ionizer 42 and the ion optical system 44. The ionizer 42, the ion optical system 44 and the quadrupole mass filter 45 are stored in a vacuum container 47, and the pressure in the vacuum container 47 is reduced by a vacuum pump 48.

The ionizer 42 is not limited to an electronic ionization device that executes ionization using electrons (e−) from the filament 43 as described as an example, and an ionization device of another system can be used.

The controller 20 acquires measurement data from the chromatograph 10 and the mass spectrometer 40 as well as controlling the chromatograph 10 and the mass spectrometer 40 through a network cable NW, and examines and processes acquired data.

The controller 20 includes a CPU (Central Processing Unit) 22, a memory 23, a display device (display) 24 made of an LCD (Liquid Crystal Display) or the like, an input unit 25 made of a keyboard, a mouse, etc. and a storage 30 made of a mass storage device such as a hard disc or an SSD (Solid State Drive).

In the storage 30, an OS (Operating System) 35, a control program 31 that controls the chromatograph 10 and the mass spectrometer 40 and processes measured data, a compound library 32, a setting storage 33 and a measurement data storage 34 are provided.

In the compound library 32, identification information such as the names of compounds, structural formulas, retention times with respect to various columns, mass spectrums, etc. are recorded as information required for an analysis of various compounds. The controller 20 further includes an interface (I/F) 21 for controlling a direct connection with an external device and a connection with an external device, etc. through a network such as a LAN (Local Area Network). Further, the controller 20 is connected to a GC controller 18 and an MS controller 49 through the network cable NW by the I/F 21.

The CPU 22, the memory 23, the storage 30 and the interface 21 constitute a computer. The memory 23 stores various information, described below, through the CPU 22 controlled by the control program 31.

The control program 31 controls the controller 20 including the CPU 22 and causes the controller 20 to transmit analysis data to an external server 29 through the network cable NW and save the data in the external server 29.

Figure 2:
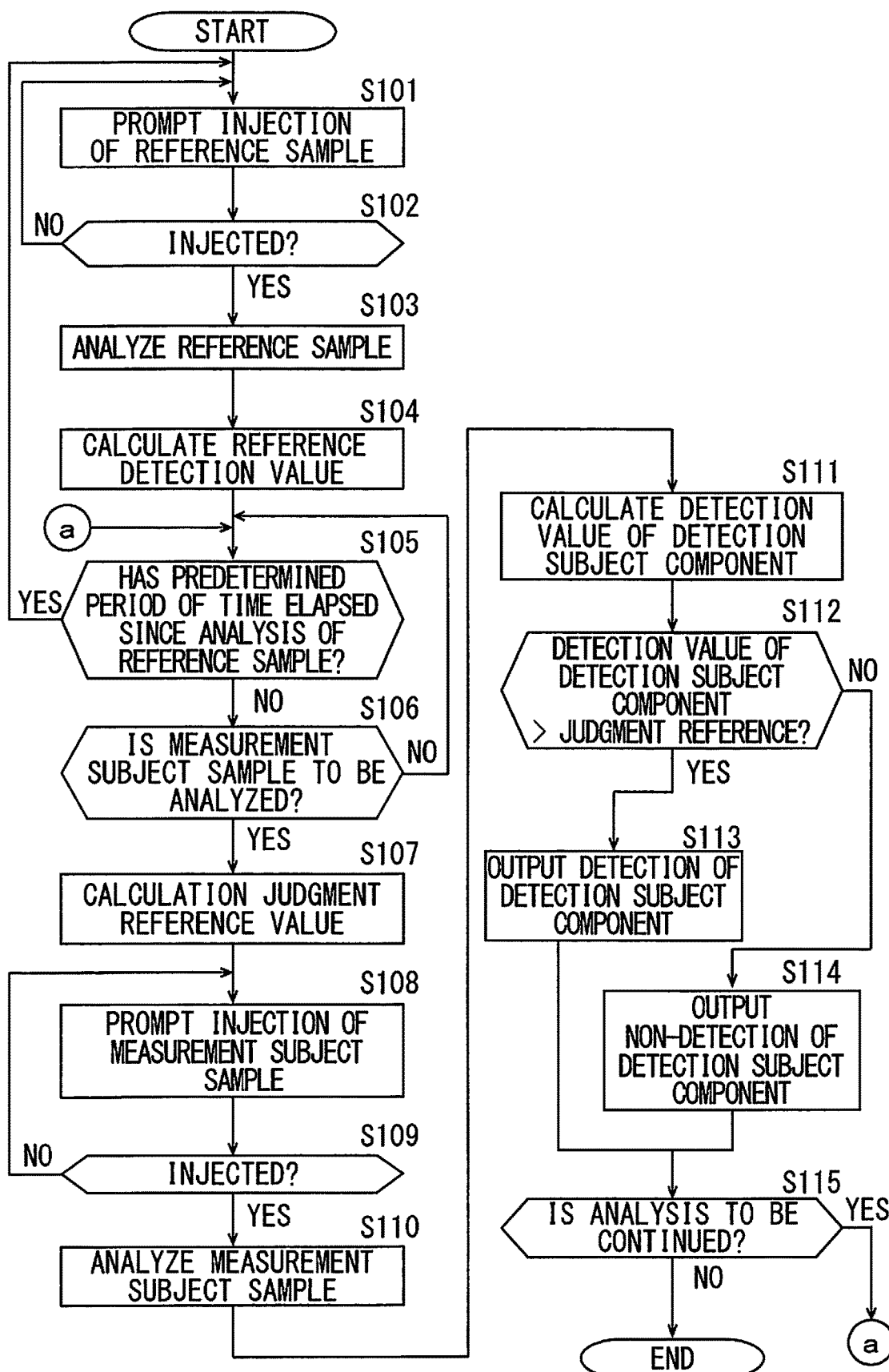
FIG. 2 is a diagram showing a flowchart of a process of an analysis method of the one embodiment.

FIG. 2 is a flowchart of the analysis method of the first embodiment executed by the CPU 22 that controls the controller 20 in accordance with the control program 31. The analysis method of the first embodiment will be described below with reference to the flowchart shown in FIG. 2.

While the CPU 22 included in the controller 20 controls each part in accordance with the control program 31, the CPU 22 that is the main constituent of execution will not be described below in the description of each step.

(Calibration of Analysis Device)

In the step S101, the controller 20 causes the display 24 to display a message prompting a user to inject a reference sample into the sample injector 11 of the chromatograph 10. When the user injects the reference sample into the sample injector 11 and inputs the information indicating that the reference sample has been injected to the input unit 25, the control program 31 judges in the step S102 that the sample has been injected, and the process proceeds to the step S103.

The reference sample is a sample containing a known predetermined amount of each of one or more types of known predetermined components. The analysis device 100 performs an analysis of the reference sample in the step S103, whereby detection sensitivity of the analysis device 100 with respect to the predetermined amount of each predetermined component can be confirmed (calibrated).

A sample containing a known predetermined amount of a predetermined component is a sample generated in a case where a known amount of a sample that includes a predetermined component at a known concentration is collected, for example, and the predetermined amount is obtained by multiplication of an amount (a mass or a volume) by a concentration (mass concentration or volume concentration).

In the step S103, the reference sample that has been injected into the sample injector 11 of the chromatograph 10 is evaporated in the sample vaporization chamber 12 and travels in the column 14 together with a carrier gas. Then, the reference sample is separated into components by the column 14 in time, and arrives at the branch valve 16 after a predetermined retention time elapses. Then, in the first embodiment, the reference sample arrives at the detector 17 from the branch valve 16 and is detected in the detector 17. An amount detected by the detector 17 is sent to the GC controller 18 and further sent to the controller 20.

Figure 3A:
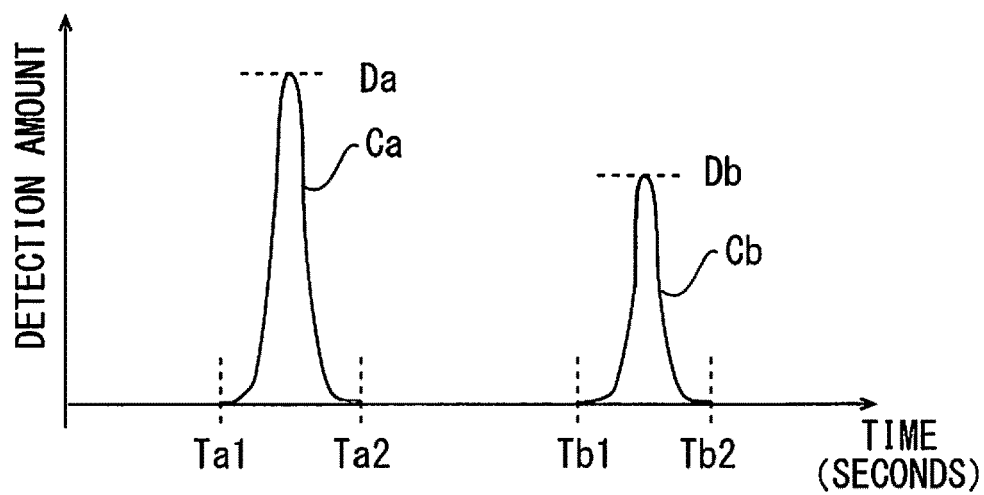
FIGS. 3A to 3c are diagrams showing the overview of a result of analysis of a reference sample, a reference detection value, a judgment reference value and a result of analysis of a measurement subject sample.

FIG. 3A is a diagram showing a graph of one example of a result of analysis of the reference sample in the step S103. The abscissa in the graph indicates an elapsed time (seconds) from the time when the reference sample is injected into the sample injector 11 of the chromatograph 10 (or from the time when heating of the column oven 15 is started), and the ordinate in the graph indicates a detection amount detected by the detector 17.

In the example shown in FIG. 3A, two known components (a component A and a component B) are included in the reference sample. In the result of detection of FIG. 3A, a detection peak curve Ca corresponding to the component A and a detection peak curve Cb corresponding to the component B are shown.

In the step S104, the controller 20 calculates peak height values of the detection peak curve Ca and the detection peak curve Cb, and stores each of the peak height values as each of a reference detection value Da for the component A and a reference detection value Db for the component B.

In other words, each of the reference detection value Da and the reference detection value Db is a peak height value of the detection amount to be detected by the detector 17 when each of the known amounts of the component A and component B is injected into the chromatograph 10. Therefore, in a case where a sample including an unknown amount of the component A is analyzed, the amount of the component A in the analyzed sample can be calculated accurately from a ratio of a peak height value of the detection amount detected by the detector 17 with respect to the reference detection value Da and the amount of the component A when the reference detection value Da is determined. This also applies to the component B.

The components A, B and the detection peak curves Ca, Cb are identified based on an elapsed point in time at which each peak curve appears. A point Ta1 in time indicated by the dashed line in FIGS. 3A to 3C indicates a peak detection start estimation point Ta1 in time of the component A which is a point in time at which appearance of the detection peak curve Ca of the component A is predicted to start. Further, a point Ta2 in time indicated by the dash line indicates a peak detection end estimation point Ta2 in time of the component A which is a point in time at which appearance of the detection peak curve Ca of the component A is predicted to end. The peak detection start estimation point Ta1 in time and the peak detection end estimation point Ta2 in time of the component A are points in time that are respectively earlier and later than a retention point in time (a point in time which represents an elapsed point in time and at which a peak is at a maximum value) of the component A by a predetermined time, and the time lag is designated by the user, for example. The peak detection start estimation point Tb1 in time and the peak detection end estimation point Tb2 in time of the component B may also be determined similarly to respective points in time of the component A.

The peak detection start estimation point Ta1 in time and the peak detection end estimation point Ta2 in time of the component A and the peak detection start estimation point Tb1 in time and the peak detection end estimation point Tb2 in time of the component B are preferably input by the user in advance to the input unit 25 in the step S101, for example. Alternatively, in the step S101, the user may input a retention time of each component and the above-mentioned time lag, and the controller 20 may calculate a peak detection start estimation point in time and a peak detection end estimation point in time from the retention point in time and the time lag. Alternatively, the user may input identification information such as the names of the component A and the component B, and the controller 20 may read out the peak detection start estimation point in time and the peak detection end estimation point in time in regard to each of the component A and the component B from the compound library 32. In the present specification, the time zone between the peak detection start estimation point Ta1 in time and the peak detection end estimation point Ta2 in time and the time zone between the peak detection start estimation point Tb1 in time and the peak detection end estimation point Tb2 in time are respectively referred to as peak detection time zones Ta, Tb.

A reference sample may include only one of the component A and the component B. Because only one detection peak curve is present in this case, identification of a detection peak curve is not required.

Three or more types of predetermined known components may be included in a reference sample.

In an analysis step, in a case where the reference detection value Da and the reference detection value Db are calculated and stored in the step S104, the process proceeds to the step S105. In the step S104, the control program 31 causes the controller 20 to store time information such as the date and time when an analysis of the reference sample is performed in the measurement data storage 34 in the storage 30 or the memory 23. The time information is not limited to the date and time and may be an elapsed time from the time when the analysis device 100 is started, an elapsed time from maintenance of the analysis device 100, etc.

(Confirmation of Elapsed Time From Last Calibration)

In the step S105, the control program 31 causes the controller 20 to judge whether a time equal to or larger than a predetermined time has elapsed since the analysis of the reference sample in the steps S101 to S104 based on the above-mentioned time information stored in the measurement data storage 34 in the storage 34 or the memory 23 in the step S104.

Then, in a case where a time equal to or larger than the predetermined time has elapsed, the process returned to the step S101, and the controller 20 performs an analysis of the reference sample and calculates the reference detection values Da, Db again.

In a case where a time equal to or larger than the predetermined time has not elapsed, the process proceeds to the step S106.

In the step S106, the controller 20 causes the display 24 to display a message prompting the user to input whether a sample to be measured is to be analyzed.

In a case where the user inputs his or her intension of performing an analysis (Yes), the process proceeds to the step S107.

On the other hand, in a case where the user does not input his or her intension of performing an analysis (Yes), the process returns to the step S105.

(Calculation of Judgment Reference Value)

In the step S107, the controller 20 calculates a judgment reference value which is a criterion for judging whether a component predicted to be included in a measurement subject sample is actually included in the measurement subject sample.

The judgment reference value is determined based on an environment standard defined by law, for example.

For example, letting the environment standard of the component A be Sa [g/L], letting the volume of a sample to be measured be V[L] and letting the mass of the component A in a case where the reference detection value Da is calculated in the step S104 be Ma[g], the judgment reference value Ja is expressed by $$Ja = Da \times (Sa \times V)/Ma \qquad (1).$$

Similarly for the component B, letting the environment standard of the component B be Sb [g/L], letting the mass of the component B in a case where the reference detection value Db is calculated in the step S104 be Mb[g], the judgment reference value Jb is expressed by $$Jb = Db \times (Sb \times V)/Mb \qquad (2).$$

The volume V[L] of the sample to be measured is the same in regard to the component A or the component B.

The judgment reference values Ja and Jb do not have to be calculated based on the values of the environment standards Sa, Sb as described above, and may be calculated based on a stricter (smaller) value than the environment standards Sa, Sb.

In calculation of the judgment reference values Ja, Jb, the user may input the volume V of the sample to be measured and the environment standards Sa, Sb of the components A, B to the input unit 25. In a case where the volume of the sample to be measured is always set to a constant amount, the user does not have to input the volume V. Further, the control program 31 may control the controller 20 and read out the environment standards Sa, Sb of the components A, B from the compound library 32 based on the already input identification information of the components A and B.

In a case where the sample to be measured is a solid, the mass Mv[g] of a subject sample is used instead of the above-mentioned volume V, and Sm[g/g] which is the mass contained per unit mass is also used for an environment standard, to calculate the above-mentioned judgment reference values Ja, Jb. Specifically, the judgment reference values Ja, Jb are calculated with use of Mv[g] and Sm[g/g] instead of Sa, S, V in the formulas (1) and (2).

After the judgment reference value is calculated in the step S107, the process proceeds to the step S108.

(Analysis of Measurement Subject Sample)

In the step S108, the controller 20 causes the display 24 to display a message prompting the user to inject the measurement subject sample into the sample injector 11 of the chromatograph 10. When the user injects the measurement subject sample into the sample injector 11 and inputs the information representing that the measurement subject has been injected into the input unit 25, the control program 31 judges in the step S109 that the sample has been injected, and the process proceeds to the step S110.

Because being similar to the step of analyzing the reference sample in the above-mentioned step S103, the step of analyzing the measurement subject sample in the step S110 will not be described.

Figure 3B:
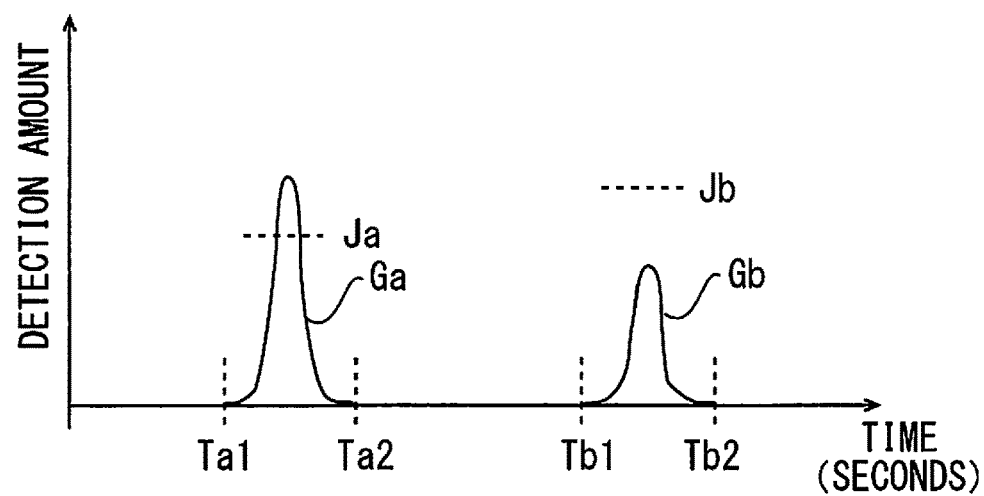

FIG. 3B is a diagram showing the graph of one example of a result of analysis of the measurement subject sample in the step S110. The abscissa and ordinate of the graph are similar to the above-mentioned FIG. 3A.

In the example of FIG. 3B, the component A and the component B included in the above-mentioned reference sample are also included in the measurement subject sample as a component to be detected (detection subject component).

In the step S111, the controller 20 calculates a peak height value of a detection peak curve Ga as a reference detection value of the component A which is the detection subject component and a peak height value of a detection peak curve Gb as a reference detection value of the component B which is the detection subject component based on an instruction provided by the control program 31.

Then, in the step S112, the controller 20 judges whether the peak height value of the detection peak curve Ga is larger than the above-mentioned judgment reference value Ja based on an instruction provided by the control program 31.

In a case where there are a plurality of detection peak curves Ga, Gb, which peak corresponds to the component A or the component B is identified based on the above-mentioned peak detection time zone. That is, in a case where the detection peak curve Ga is present in the period from the peak detection start estimation point Ta1 in time to the peak detection end estimation point Ta2 in time of the component A, that is, the peak detection time zone Ta of the component A, or is present in its vicinity, it is judged that the detection peak curve Ga is a peak of the component A. This also applies to the component B.

As shown in FIG. 3B, since the peak height value of the detection peak curve Ga is larger than the judgment reference value Ja, the process proceeds to the step S113, and detection of the component A from the measurement subject sample is output. On the other hand, in a case where the peak height value of the detection peak curve Ga is smaller than the judgment reference value Ja, the process proceeds to the step S114, and non-detection of the component A from the measurement subject sample is output. The destination of output in these cases is any one or more of the display 24, the memory 23, the measurement data storage 34 and the external server 29.

Since the two types of detection subject components (the components A, B) are detected in the present example, the above-mentioned steps S112 to S114 are preferably repeated with respect to the components A, B. As shown in FIG. 3B, since the peak height value of the detection peak curve Gb is smaller than the judgment reference value Jb, the process proceeds from the step S112 to the step S114 in regard to the component B, and non-detection of the component B from the measurement subject sample is output.

After the step S113 and the step S114 end, the process proceeds to the step S115. Further, the controller 20 causes the display 24 to display a message prompting the user to input whether to continue an analysis.

In a case where the user inputs his or her intension of performing an analysis (Yes), the process proceeds to the step S105. Further, the controller 20 outputs an instruction to each part and repeats the analysis of the measurement subject sample.

On the other hand, in a case where the user inputs his or her intension of not performing an analysis (No), the process ends.

In the above-mentioned first embodiment, the predetermined time mentioned in the step S105 differs depending on required accuracy of an analysis (detection). The predetermined time is required to be about several hours to suppress a change of the analysis device 100 over time in order to execute more accurate detection. On the other hand, in a case where a certain degree of change over time is allowed, the predetermined time may be about one month or may be about a period of periodical maintenance of the analysis device 100. A change over time refers to contamination of the device, deterioration over time, a change in stability state of the device due to a difference in elapsed time from the activation of device, a difference in device calibration state, etc.

Further, in the step S105, a judgment may be made not only based on an elapsed time after the analysis of the reference sample but also based on a point in time and the day of a week, or a point in time and the date. Alternately, judgment may be made based on a point in time, the day of a week and an elapsed time, or based on a point in time, the date and an elapsed time.

As one example, it can be judged as "Yes" at a predetermined time every day. Alternatively, it can be judged as "Yes" at a predetermined date every month or a predetermined point in time on a predetermined day of a week. In this case, in a case where an analysis of the reference sample is performed in the predetermined time, even when it is a predetermined point in time, it can be judged as "No."

Modified Example of Analysis Method

In the above-mentioned first embodiment, an analysis (calibration) is performed with the use of the reference sample including the component A and the component B, and the analysis of the measurement subject sample that is predicted to include the component A and the component B is performed. On the other hand, in a present modified example, a highly accurate analysis in which a change of the analysis device 100 over time is corrected is performed with respect to a detection subject component other than a component used for calibration. Since the large part of the configuration of the present modified example is common to the above-mentioned first embodiment, description in regard to the part common to the first embodiment will be suitably not described.

Figure 3C:
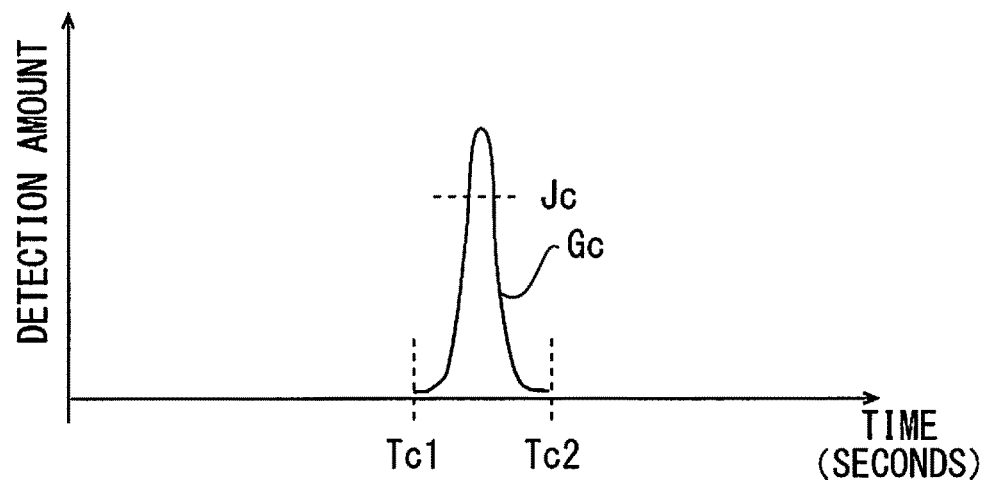

FIG. 3C is a diagram showing a graph of one example of a result of analysis with respect to a measurement subject sample including a component C which is other than the component A or the component B included in the reference sample. The abscissa and ordinate of the graph are similar to those in the above-mentioned FIG. 3A. In FIG. 3C, a detection peak curve Gc of the component C is shown at a position corresponding to a peak detection time zone Tc (between a peak detection start estimation point Tc1 in time and a peak detection end estimation point Tc2 in time) of the component C on the abscissa. The peak detection start estimation point Tc1 in time and the peak detection end estimation point Tc2 in time of the component C are also determined similarly to the peak detection start estimation point Ta1 in time and the peak detection end estimation point Ta2 in time of the above-mentioned component A.

The dash line Jc in the FIG. 3C is a judgment reference value Jc which is a criterion for judging whether the component C is included in the measurement subject sample. In the present modified example, the judgment reference value Jc is calculated with the use of relative response factors Ra, Rb, Rc of the components A, B, C with respect to the analysis device 100. A relative response factor represents a relative value of a detection amount in a case where a certain amount of each component is analyzed in the analysis device 100. Therefore, it is possible to correct a change of the analysis device 100 over time based on a result of calibration in regard to the component A or the component B without performing an analysis (calibration) of the reference sample in the steps S101 to S104 in regard to the component C.

As one example, the judgment reference value Jc of the component C is determined by the formula (3) or the formula (4) with the use of a volume V[L] of the above-mentioned measurement subject sample, a mass Ma[g] of the component A at the time of calibration, a mass Mb[g] of the component B at the time of calibration, the reference detection value Da of the component A, the reference detection value Db of the component B and an environment standard Sc[g/L] of the component C.

$$Jc = Da \times (Sc \times V) \times (Rc/Ra)/Ma \qquad (3)$$

$$Jc = Db \times (Sc \times V) \times (Rc/Rb)/Mb \qquad (4)$$

Also in regard to the component C, the judgment reference value Jc does not have to be calculated based on the value of the environment standard Sc as described above, and may be calculated based on a stricter (smaller) value than the environment standard Sc.

Similarly to the above-mentioned formulas (1) and (2), in a case where a sample to be measured is a solid, the judgment reference value Jc is calculated with the use of a mass Mv[g] of a subject sample and an environment standard Sm[g/g] represented by a mass contained per unit mass instead of V[g] and Sc[g/L] in the formula (3) and the formula (4).

In the present modified example, in the step S107 in the flowchart shown in FIG. 2, the controller can cause the display 24 to prompt the user to input the identification information of the component C, the peak detection time zone Tc and a value of the environment standard Sc, and the user can input these values to the input unit 25 in accordance with this warning display. Alternatively, when the user inputs the identification information of the component C to the input unit 25, the control program 31 can instruct the controller 20 to read out the peak detection time zone Tc of the component C and a value of the environment standard Sc from the compound library 32.

Also in the present modified example, in the step S112, whether a peak height value of the detection peak curve Gc is larger than the judgment reference value Jc is judged. If the peak height value is larger than the judgment reference value Jc, the process proceeds to the step S113. In a case where not, the process proceeds to the step S114.

While it is described in the above-mentioned description that only the component C is included in the measurement subject sample in the present modified example, one or more detection subject components in addition to the component C may be included in the measurement subject sample. In this case, similarly to the above-mentioned values for the component C, the user also inputs a peak detection time zone and an environment standard of each detection subject component in the input unit or the controller 20 reads out the information stored in the compound library 32 based on the identification information input by the user.

Further, the component A or the component B detected in the calibration in the steps S101 to S104 may be included in the measurement subject sample in the present modified example. In this case, each of the judgment reference values Ja, Jb with respect to the component A or the component B may be determined by the method described in the above-mentioned first embodiment.

In either the first embodiment or the modified example, a so-called area value (integral value) may be used instead of the above-mentioned peak height value as the reference detection values Da, Db of the predetermined components. The area value is a value obtained by integration of detection amounts in the range of the peak detection time zone Ta (the range from Ta1 to Ta2) in regard to a detection peak curve such as the detection peak curve Ca of FIG. 3A.

In this case, the judgment reference values Ja, Jb, Jc are also calculated based on the reference detection values Da, Db for which area values are used. A detection amount of the detection subject component in the measurement subject sample is also compared with the judgment reference values Ja, Jb, Jc with the use of not a peak height value but an area value.

It is possible to be unlikely to be affected by a noise component included in a signal of a detection amount and make judgment more accurately by employing an area value as a reference detection value of a detection peak curve.

On the other hand, it is possible to use a simpler process system and calculate a reference detection value by employing a peak height value as a reference detection value of a detection peak curve.

Further, in the above-mentioned formulas 1 to 4 and the like, the judgment reference values Ja, Jb, Jc are calculated with the use of the masses Ma, Mb of each component. However, calculation can also be executed with the use of the number of moles and not limited to a mass.

Further, when a reference sample is analyzed, in a case where an elapsed time at which the component A or B in the reference sample is actually detected is different from a stored peak detection time zone that has been input, etc., the peak detection time zone actually measured from an actually detected peak is preferably and newly stored again as each of the peak detection time zones Ta, Tb of the component A or B. This is because a retention time may fluctuate due to a change of the analysis device 100 over time, and the fluctuation is to be corrected.

However, in a case where a stored peak detection time zone and a detected elapsed time are largely different from each other (by 10% or more, for example), the peak detection time zone is preferably not stored again as each of the peak detection time zones Ta, Tb but the control program 31 preferably displays an error message in the display 24 and warns the user about the possibility of an error.

As shown in FIG. 4, a background BG may be added to a measurement value of a detection amount. In this case, in a case where either a peak height value or an area value is employed as a reference detection value of the detection peak curve Ca2, it is desirable that the background BG is removed and the reference detection value is calculated.

As one example, as shown in FIG. 4, in a case where the background BG increases with time, the reference detection value is calculated based on a function BGa to which the background BG is interpolated at a position (time) of the detection peak curve Ca2.

In a case where a peak height value is employed, the peak height value may be a true peak height value Da3 obtained by subtraction of a value of the function BGa at the point in time from an apparent peak height value Da2 of the detection peak curve Ca2.

Further, in a case where an area value is employed, a value obtained by integration of the values obtained by subtraction of a value of the function BGa from a value of he detection peak curve Ca2 in the peak detection time zone Ta (from Ta1 to Ta2) may be the area value of the detection peak curve Ca2.

In either the first embodiment or the modified example, the chromatograph 10 is not limited to the above-mentioned gas chromatograph and may be a liquid chromatograph.

Effects of First Embodiment and Modified Example (1) The above-mentioned analysis method of the first embodiment and the modified example has a configuration in which the reference sample that contains the predetermined amounts Ma, Mb of the predetermined components A, B is analyzed by the analysis device 100 using the chromatograph, each of the reference detection values Da, Db which is a detection value of each of the predetermined amounts Ma, Mb of each of the predetermined components A, B detected by the analysis device 100 is obtained, each of the judgment reference values Ja, Jb, Jc which is a criterion for judging whether a concentration of each of the detection subject components A, B, C in a measurement subject sample is equal to or larger than a reference concentration or equal to or smaller than the reference concentration based on each of the reference detection values Da, Db is calculated, and the measurement subject sample is analyzed by the analysis device 100 and it is judged that each of the detection subject components A, B, C has been detected in a case where a detection value exceeding each of the judgment reference values Ja, Jb, Jc is detected in each of the peak detection time zones Ta, Tb, Tc corresponding to each of the detection subject components A, B, C.

With this configuration, the analysis device 100 is calibrated by the analysis of the reference sample, and a change of the analysis device 100 over time can be corrected. Thus, whether an amount of each of the detection subject components A, B, C which is equal to or larger than the reference amount (reference concentration) is present can be judged accurately.

With the conventional analysis method using a gas chromatograph, in a case where identification of a detected peak and a waveform process were not appropriate, even when a detection subject component was included at a high concentration, the component could not be judged as the detection subject component and was missed.

On the other hand, with the analysis methods in the first embodiment and the modified example, whether a detection subject component is detected or not detected is judged based on whether the detection subject component is included at a concentration equal to or larger than a reference concentration or equal to or smaller than the reference concentration in a peak detection time zone. Therefore, with the analysis methods in the first embodiment and the modified example, whether a detection subject component is detected or not detected can be judged regardless of a process of peak identification or a waveform process.

(2) It is possible to clarify not only detection of a detection subject component but also non-detection of the detection subject component by outputting detection of the detection subject component or non-detection of the detection subject component in a peak detection time zone corresponding to the detection subject component.

(3) A plurality of predetermined components A, B are included in a reference sample, and the detection subject components A, B are the same substance as one of the plurality of components. Thus, calibration using the same component as the detection subject components A, B in a measurement subject sample can be executed, and a more accurate judgment can be made.

(4) The detection subject component C is a substance different from the predetermined components A, B included in the reference sample, and the judgment reference value Jc is calculated based on the reference detection values Da, Db of the predetermined components A, B, the reference concentration of the detection subject component C and the relative response factors Ra, Rb, Rc with respect to the predetermined components A, B and the detection subject component C. Thus, a change of the analysis device 100 over time is corrected, and a judgment can be made accurately in regard to the component C different from the predetermined components A, B included in the reference sample used for calibration.

(5) It is possible to use the information relating to a point in time at which an analysis, that is, calibration of the reference sample is performed, in the subsequent analysis by storing the time information relating to a point in time at which an analysis of the reference sample is performed in the storage device.

(6) Whether a time equal to or larger than a predetermined time has elapsed since an analysis of a reference sample is judged based on the time information stored in the storage device. In a case where a period of time equal to or larger than a period of time has elapsed, it is possible to further improve accuracy of an analysis of a measurement subject sample by performing an analysis of a reference sample again.

Second Embodiment of Analysis Method

With the above-mentioned analysis methods in the first embodiment and the modified example, an analysis of a reference sample and an analysis of a measurement subject sample are performed based on a detection amount obtained by the detector 17 of the chromatograph 10. On the other hand, with an analysis method of a second embodiment described below, an analysis of a reference sample and an analysis of a measurement subject sample are performed based on a detection amount obtained by the ion detector 46 of the mass spectrometer 40. That is, the detection amount detected by the ion detector 46 is sent to the MS controller 49 and further sent to the controller 20.

Since the configuration of other part of the second embodiment is similar to the above-mentioned analysis methods of the first embodiment and the modified example, a detailed description will not be provided.

With the analysis method of the second embodiment, the branch valve 16 is set such that a sample output from the column 14 is supplied to the sample introducer 41 of the mass spectrometer 40. The sample supplied to the sample introducer 41 is ionized in the ionizer 42 as described above and arrives at the quadrupole mass filter 45 that separates ions in accordance with an m/z through the ion optical system 44. Then, only ions having a predetermined m/z are selectively transmitted by the quadrupole mass filter 45 and detected by the ion detector 46.

The CPU 22 controls the mass spectrometer 40 through the MS controller 49 in accordance with the control program 31 in analyzing a reference sample in the step S103 and analyzing a measurement subject sample in the step S103 such that ions having an m/z corresponding to each of the detection subject components A, B, C are selectively detected. Specifically, in each of the peak detection time zones Ta, Tb, Tc of each of the detection subject components A, B, C, the condition of an RF voltage added to the quadrupole mass filter 45 is set such that the quadrupole mass filter 45 selectively transmits ions having an m/z corresponding to each of the detection subject components A, B, C.

The ions corresponding to each of the detection subject components A, B, C may be a so-called target ion or a qualifier ion with respect to each component.

Effects of Analysis Method of Second Embodiment (7) With the analysis method of the second embodiment, an analysis device 100 including a mass spectrometer 40 in a rear part of a chromatograph 10 is used, and an analysis of a reference sample and an analysis of a measurement subject sample are performed based on a detection signal detected by the mass spectrometer 40 in addition to the analysis method of the first embodiment and the analysis method of the modified example.

With this configuration, because only ions having a predetermined m/z (mass-to-charge ratio) are selected and a detection amount is detected, even in a case where a component other than the detection subject components A, B, C is included in a measurement subject sample, a detection amount of each of the detection subject components A, B, C can be measured more accurately. Thus, whether an amount equal to or larger than a reference amount (reference concentration) of each of the detection subject component A, B, C is present can be judged more accurately.

Embodiment of Program

As described above, in each of the above-mentioned embodiments and modified example, a program (control program 31) for implementing the above-mentioned functions may be recorded in a computer-readable recording medium, and the program recorded in this recording medium may be read by a computer system for the above-mentioned analysis using the analysis device 100. The "computer system" as used herein includes hardware such as an OS (Operating System) and peripheral devices. Further, the "computer-readable recording medium" refers a mobile recording medium such as a flexible disc, an optical magnetic disc, an optical disc or a memory card and a storage device such as hard disc built-in in the computer system. Further, the "computer readable recording medium" may include an object that holds a program movably for a short period of time such as a communication line that is used in a case where a program is transmitted through a network such as the Internet or a communication line such as a telephone line and an object that holds a program for a certain time such as a server or a volatile memory in the computer system which is a client. Further, the above-mentioned program may be to implement part of the functions of the above-mentioned control program 31, and may be implemented by a combination of the above-mentioned function and the program that is already recorded in the computer system.

Further, the above-mentioned program can be provided via a recording medium such as a CD-ROM and a data signal such as the Internet. For example, the controller 20 including the CPU 22, the memory 23 and the storage 30 in FIG. 1 receive a program via the CD-ROM inserted in to a disc drive 26. Further, the controller 20 has a connecting function to the network cable NW. The server 29 connected to the network functions as a server computer that provides the above-mentioned program and transfers a program to a recording medium such as the storage 30. That is, a program is transferred as a data signal by a carrier wave and transmitted through the network cable NW. In this manner, the program can be supplied as a computer-readable computer program in various forms such as a recording medium or a carrier wave.

All of the steps in the flowchart shown in FIG. 2 are not necessarily required to be executed.

Effects of Embodiments of Program (8) The program 31 of the present embodiment controls the analysis device 100 using the chromatograph 10 by the controller (computer) 20, and causes the analysis device 100 to execute the processes of analyzing a reference sample containing a predetermined amount of a predetermined component, obtaining a reference detection value which is a detection value of the predetermined amount of the predetermined component detected by the analysis device, calculating a judgment reference value which is a criterion for judging whether a detection subject component is present in a measurement subject sample at a concentration equal to or larger than a reference concentration based on the reference detection value, and analyzing the measurement subject sample by the analysis device 100 and judging that the detection subject component has been detected in a case where a detection value exceeding the judgment reference value is detected in a peak detection time zone corresponding to the detection subject component.

With this configuration, the analysis device 100 can be calibrated by an analysis of a reference sample, and a change of the analysis device 100 over time can be corrected. Thus, whether an amount of each of the detection subject components A, B, C that is equal to or larger than a reference amount (reference concentration) is present can be judged accurately.

(9) The program 31 has a configuration in which a judgment reference value is calculated based on a reference detection value of a predetermined component, a reference concentration of the detection subject component and a relative response factor with respect to the predetermined component and the detection subject component. Thus, a change of the analysis device 100 over time is corrected, and a judgment can be made accurately also in regard to a component C different from the predetermined components A, B used for calibration.

While various embodiments and a modified example are described above, the present invention is not limited to these content. Further, each embodiment may be applied alone or embodiments may be combined. Other embodiments are possible without departing from the spirit and scope of the present invention.

The content of the disclosure of the following application, upon which priority is claimed, is hereby included herein by reference.

Japanese Patent Application 2018-220328, filed on 26 Nov. 2018.

REFERENCE SIGNS LIST

100 . . . Analysis device, 10 . . . Chromatograph, 11 . . . Sample injector, 14 . . . Column, 16 . . . Branch valve, 17 . . . Detector, 18 . . . GC controller, 20 . . . Controller, 30 . . . Storage, 31 . . . Control program, 40 . . . Mass spectrometer, 45 . . . Quadrupole mass filter, 46 . . . Ion detector, 49 . . . MS controller, Da, Db . . . Reference detection values, Ja, Jb, Jc . . . Judgment reference values

The invention claimed is:

1. An analysis method including:
analyzing a reference sample that contains a predetermined amount of a predetermined component by an analysis device using a chromatograph and obtaining a reference detection value which is a detection value of the predetermined amount of the predetermined component detected by the analysis device;
calculating a judgment reference value which is a criterion for judging whether a concentration of a detection subject component in a measurement subject sample is equal to or larger than a reference concentration or equal to or smaller than the reference concentration based on a ratio of the reference concentration to the predetermined amount of the predetermined component in the reference sample and the reference detection value; and
analyzing the measurement subject sample by the analysis device and judging that the detection subject component with the concentration equal to or larger than the reference concentration has been detected in a case where a detection value exceeding the judgment reference value is detected in a peak detection time zone corresponding to the detection subject component.

2. The analysis method according to claim 1, wherein detection of the detection subject component or non-detection of the detection subject component in a peak detection time zone corresponding to the detection subject component is output.

3. The analysis method according to claim 1, wherein the judgment reference value is calculated based on the reference detection value with use of a formula.

4. The analysis method according to claim 3, wherein the formula is a formula for calculating the criterion for judgment reference value based on the judgment reference detection value and a predetermined the reference concentration with respect to the detection subject component.

5. The analysis method according to claim 1, wherein a plurality of the predetermined components are included in the reference sample, and
the detection subject component is a same substance as one of the plurality of the predetermined components.

6. The analysis method according to claim 1, wherein the detection subject component is a substance different from the predetermined component included in the reference sample, and
the judgment reference value is calculated based on the reference detection value of the predetermined component, the reference concentration of the detection subject component and a relative response factor between the predetermined component and the detection subject component.

7. The analysis method according to claim 1, wherein the detection value is a peak height value of a detection signal detected by the analysis device.

8. The analysis method according to claim 1, wherein the detection value is an integrated value obtained by integration of detection signals detected by the analysis device in the peak detection time zone of the predetermined component or the detection subject component.

9. The analysis method according to claim 1, wherein the analysis device includes a mass spectrometer in a rear part of the chromatograph, and
an analysis of the reference sample and an analysis of the measurement subject sample are performed based on a detection signal detected by the mass spectrometer.

10. The analysis method according to claim 1, wherein time information in regard to a point in time at which the analysis of the reference sample is performed is stored in a storage device.

11. The analysis method according to claim 10, wherein whether a time equal to or larger than the predetermined period of time has elapsed since the analysis of the reference sample is judged based on the time information stored in the storage device.

12. A non-transitory computer readable medium storing a program for controlling an analysis device using a chromatograph,
the program causing a computer to execute the processes of:
analyzing a reference sample containing a predetermined amount of a predetermined component;
obtaining a reference detection value which is a detection value of the predetermined amount of the predetermined component detected by the analysis device;
calculating a judgment reference value which is a criterion for judging whether a detection subject component is present in a measurement subject sample at a concentration equal to or larger than a reference concentration based on a ratio of the reference concentration to the predetermined amount of the predetermined component in the reference sample and the reference detection value; and
analyzing the measurement subject sample by the analysis device and judging that the detection subject component with the concentration equal to or larger than the reference concentration has been detected in a case where a detection value exceeding the judgment reference value is detected in a peak detection time zone corresponding to the detection subject component.

13. The non-transitory computer readable medium according to claim 12, wherein
the program causes the computer to execute a process of calculating the judgment reference value based on the reference detection value of the predetermined component, the reference concentration of the detection subject component and a relative response factor between the predetermined component and the detection subject component.

* * * * *